United States Patent [19]
Persson

[11] 3,733,962
[45] May 22, 1973

[54] SHEET METAL DEBURRING APPARATUS

[75] Inventor: Tage G. Persson, Bloomfield, N.J.

[73] Assignee: Falls Metal Works, Inc., Little Falls, N.J.

[22] Filed: Nov. 22, 1971

[21] Appl. No.: 200,948

Related U.S. Application Data

[63] Continuation of Ser. No. 7,787, Feb. 2, 1970, abandoned.

[52] U.S. Cl. .................... 90/24 F, 90/21 B, 29/33 S
[51] Int. Cl. ............................................. B23d 1/26
[58] Field of Search ............... 90/24 R, 24 F, 24 A, 90/24 E, 21 R, 21 B, 86; 144/117 B, 120, 246 D, 247; 29/33 S

[56] References Cited

UNITED STATES PATENTS

| | | | |
|---|---|---|---|
| 2,318,732 | 5/1943 | Yoder | 90/24 R |
| 3,437,008 | 4/1969 | Persson | 90/24 F |
| 3,254,568 | 6/1966 | Pickard | 90/24 F |
| 2,306,620 | 12/1942 | Futhey | 90/24 A |
| 2,242,815 | 5/1941 | Darner | 90/24 R |

Primary Examiner—Gil Weidenfeld
Attorney—Lawrence I. Lerner et al.

[57] ABSTRACT

The present invention provides sheet metal deburring apparatus for removing burrs from the edge of a workpiece. The apparatus includes a base member which defines a path of travel for the workpiece, a pair of vertically aligned rollers for moving the workpiece along the path, and a cutting tool for removing burrs from the workpiece as it is moved along the path. The apparatus is particularly characterized by the fact that the cutting tool is positioned so that its cutting edge is disposed between the axes of the rollers in a vertical plane containing the axes of the rollers and within the path so that the cutting edge engages the workpieces at a point substantially adjacent to the engagement of the workpieces by the rollers. The result of the positioning of the cutting tool in such a manner is that the workpiece is firmly gripped during deburring resulting in less chatter and a greatly improved and more efficient deburring apparatus.

5 Claims, 4 Drawing Figures

INVENTOR.
TAGE G. PERSSON
BY Kenwood Ross &
Chester E. Flavin
ATTORNEYS.

PATENTED MAY 22 1973

INVENTOR.
TAGE G. PERSSON

BY Kenward Ross &
Chester E. Flavin
ATTORNEYS.

SHEET METAL DEBURRING APPARATUS

CROSS-REFERENCES TO RELATED APPLICATIONS

This application is a continuation of my copending U. S. application No. 7,787, filed Feb. 2, 1970 now abandoned.

FIELD OF THE INVENTION

The present invention relates to sheet metal deburring apparatus, and particularly to such apparatus for removing burrs from the edge of a workpiece.

BACKGROUND OF THE INVENTION

Sheet metal deburring apparatus is well known as evidenced by the present inventor's prior U. S. Pat. No. 3,437,008. However, though the previous apparatus performs substantially satisfactorily, it has certain drawbacks. The principle drawback is that the deburring is not always clean. This was apparently due to the fact that there was vibration of the workpiece when it was engaged by the cutting tool.

SUMMARY OF THE INVENTION

According to the present invention, there is provided in sheet metal deburring apparatus for removing burrs from the edge of a workpiece, comprising a base member which provides a path of travel for the workpiece, a pair of vertically aligned rollers adapted to move a workpiece along said path, and a cutting tool for removing burrs from the workpiece as it is moved along said path, the improvement that the cutting tool is positioned so that its cutting edge is disposed between the axes of the rollers in a vertical plane containing the axes of the rollers and within said path so that the cutting edge engages the workpieces at a point substantially adjacent to the engagement of the workpieces by the rollers.

It has been found that the sheet metal deburring apparatus according to the present invention is simpler and more economical to produce, and that the deburring operation results in very clean edges for the workpieces. It is believed that such clean edges are achieved due to the fact that the rollers strongly grip the workpiece at a point substantially adjacent to the point of engagement of the cutting edge of the cutting tool with the workpiece.

BRIEF DESCRIPTION OF THE DRAWINGS

In order that the invention may be fully understood, it will now be described with reference to the accompanying drawings in which.

DESCRIPTION OF THE PREFERRED EMBODIMENT

Figure 1:
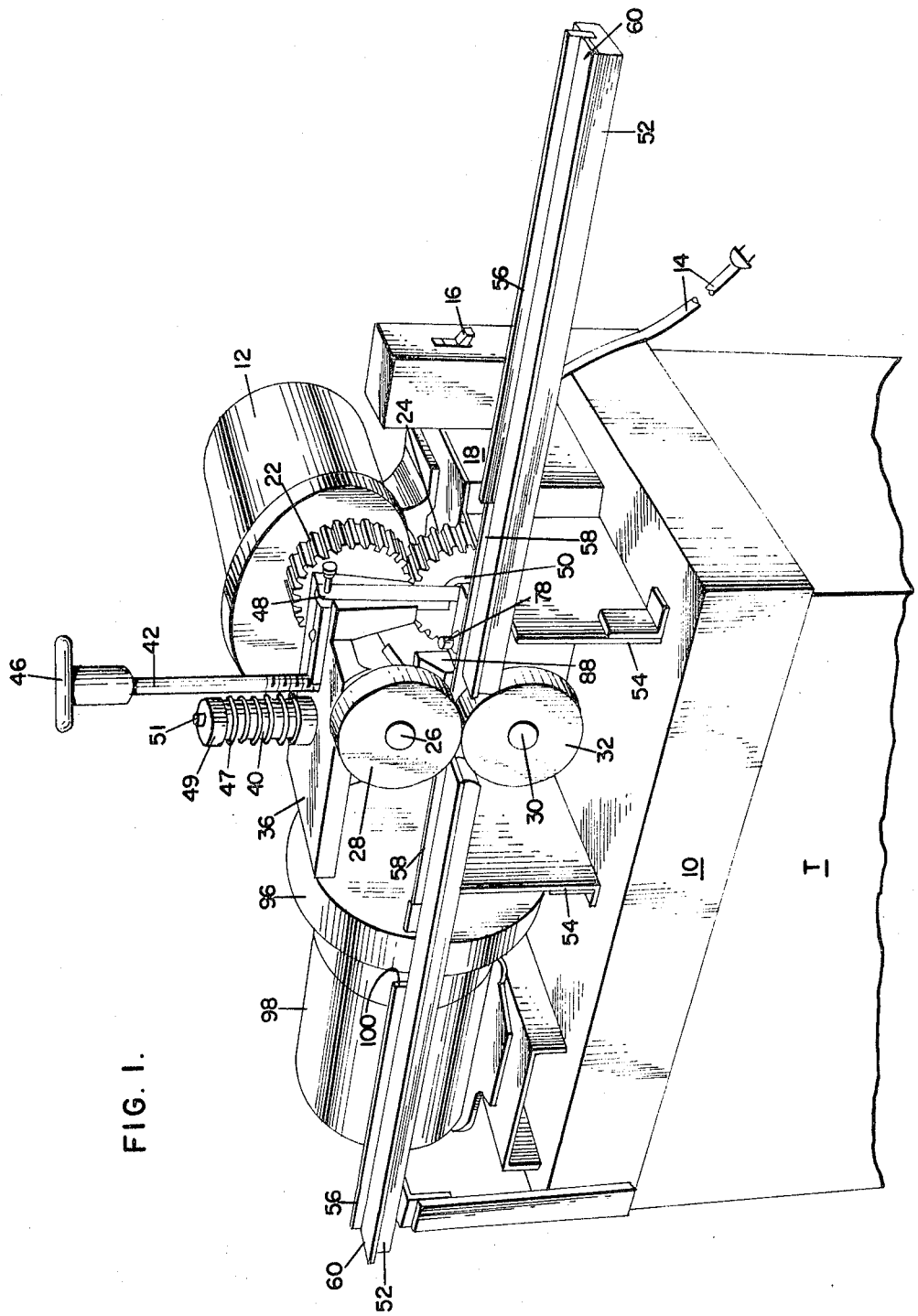
FIG. 1 is a front perspective view of sheet metal deburring apparatus in accordance with the present invention.

It will be appreciated that the following description is by way of example only and is not intended as a limitation to the scope of the invention. Further, similar reference numerals refer to like parts throughout the drawings.

The present apparatus generally comprises a base 10 which supports a table or workbench T. A motor 12 having an electric line 14 is mounted on a stand 18 which, in turn, is disposed on base 10. A switch 16 is provided for operating motor 12. The motor drive shaft (not shown) carries a spur gear 20, see FIG. 2, which meshes with an upper pinion 22 adapted to mesh with a lower pinion 24.

Figure 2:
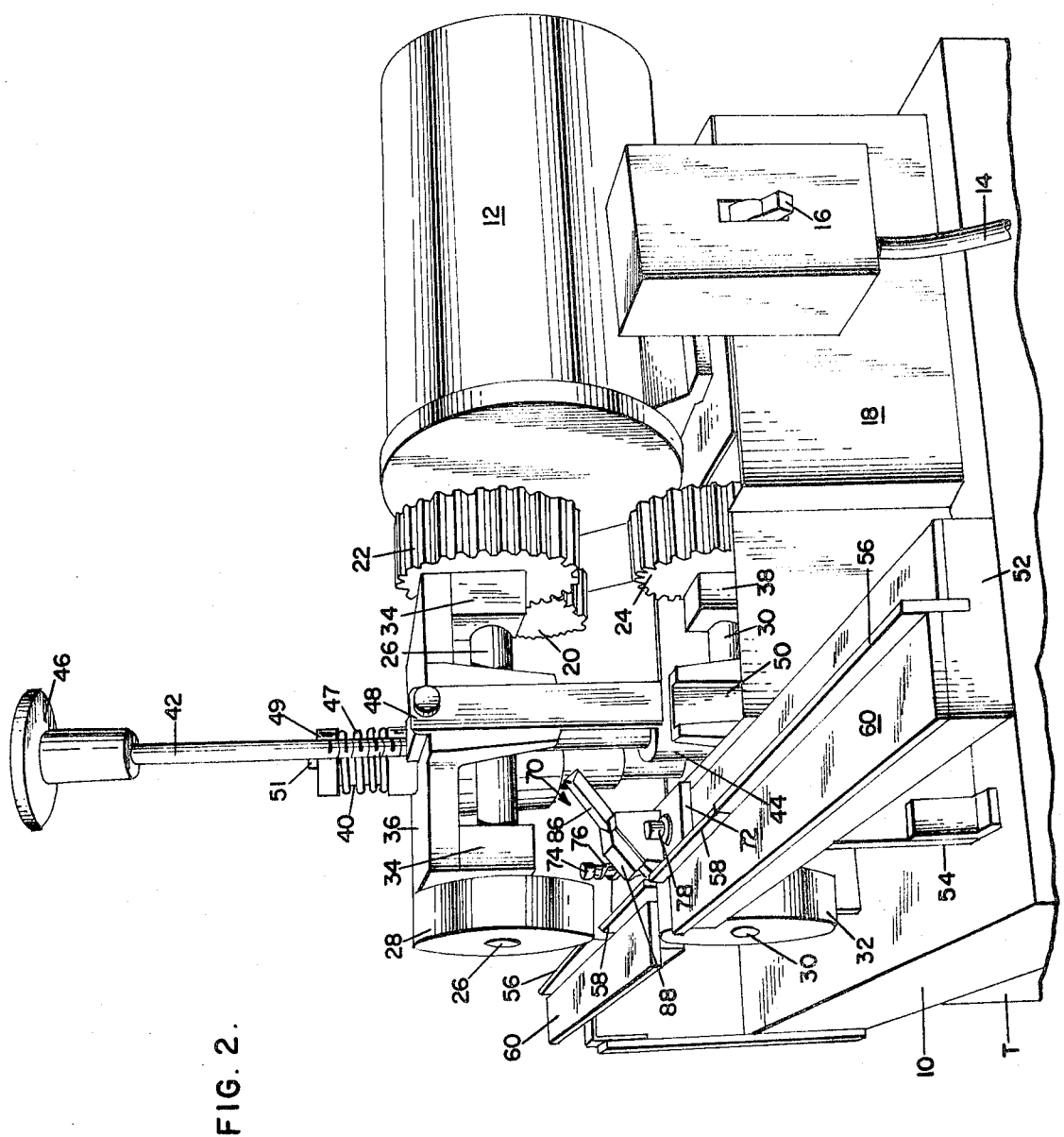
FIG. 2 is a side perspective view of the sheet metal deburring apparatus of FIG. 1.

Pinion 22 is fixed to the inner end of a horizontally extending shaft 26 having an upper roller 28 fixed to its opposite end. Pinion 24 is fixed to the inner end of a horizontally extending shaft 30 having a lower roller 32 fixed to its opposite end. Shaft 26 is journalled in supports 34 which depend from a raised platform 36, and shaft 30 is journalled in supports 38, only one of which is shown in FIG. 2, which extend upwardly from base 10.

Platform 36 is vertically slidable relative to a post 40 which extends upwardly from base 10. Such vertical movement is effected by a jack screw 42 journalled at its lower end in a bearing 44, see FIG. 2, and extending vertically upwardly therefrom through a threaded opening provided in platform 36. Jack screw 42 has a handle 46 fixed to its upper end for facilitating its rotation. The jack screw permits incremental adjustments of the spaces between the rollers.

A compression spring 47 is sleeved upon the upper end of post 40 which is capped by a cap 49 fixed to the post by a bolt 41. Appropriate rotation of the bolt increases or decreases the pressure of the cap on the spring. This spring-loading maintains a constant pressure of the rollers on the workpiece regardless of its gauge.

A guide post 48 is fixed at its upper end to a side wall of platform 36 and depends vertically therefrom, its lower end being slidably receivable in a slotted bracket 50 fixed to and extending vertically upwardly from base 10. By this arrangement, platform 36 remains stationary during movement of the workpiece past the rollers and will not pivot.

A gate assembly includes a horizontally extending support bar 52 disposed upwardly of base 10 between the rollers and fixed to plates 54 extending upwardly from the base, an upright hardened steel gate 56 which may optionally include hardened carbide wear plates 58 adjacent the cutting tool, to be described, and a smooth base plate 60 for facilitating the passage of a workpiece therealong. Base plate 60 is preferably fabricated from brass to preclude scratching of polished stock. Gate 56 is disposed at a slight angle relative to the rollers wherefore the workpiece is pressed inwardly by the rollers toward the cutting tool. An opening 62 is provided in the gate to permit the passage of the cutting tool therethrough, and base plate 60 and support bar 52 are cut away as at 63 so that rollers 28 and 32 may extend into the path of a workpiece being moved relative to the gate.

A cutter sub-assembly generally indicated by 70 includes a base 72 disposed on the upper surface of support bar 52. A pivot pin 74 extends downwardly through the support bar and the base thereby permitting horizontal rotation of the base, the pivot pin having a compression spring 76 sleeved thereon for facilitating movement. A bolt 78, disposed in horizontally spaced relation to pivot pin 74, extends through a slot 80 in the base and is threaded in an opening (not shown) in the support bar. When bolt 78 is loosened, the base may be rotated relative to the support bar and the gate to the desired position of adjustment whereupon the bolt is tightened to lock the base relative to the support bar. Sight marks 82 on the base are adapted to register with a sight mark 84 on the support bar to insure accurate positioning.

It is noted that gate 56 is fixed in contrast to the movable gate of Persson's previous patent. With this construction, only the cutter sub-assembly 70 need be moved to determine the depth of cut so that the present construction is both simplier to use and more reliable than the patented apparatus. It is also noted at this point that the present construction utilizes a single pair of rollers in constrast to the double pair of rollers required in accordance with the aforesaid patent.

Since the base carries the cutting tool, to be described, it is highly desirable to incorporate an adjustable base whereby the cutting edge of the cutting tool may be accurately positioned to obtain the desired depth of cut. To this end, a cutting tool 86 is releasable and adjustably fixed to a mounting block 88 which extends upwardly from base 72, the cutting tool being held in the mounting block by a plate 90 fixed to the block by screws 92. Screws 94 threaded in plate 90 bear on the cutting tool so that it may be accurately and securely set in the desired position. The cutting tool extends angularly outwardly from the mounting block through cutter opening 62 so as to have one of its cutting edges disposed in the path of the workpiece being moved along and relative to gate 56 and wear plates 58.

It will be noted that the point of engagement of cutting tool 86 with a workpiece is opposite to and substantially adjacent to the portion of the workpiece that is engaged by the rollers 28 and 32 so that the workpiece is held in a vice-like grip by the single pair of rollers 28 and 32 at a portion substantially adjacent to where cutting tool 86 engages the workpiece. Cutting tool 86 is preferably of triangulate shape having three cutting edges whereby as one cutting edge becomes worn or dull or chipped the tool need not be discarded but need only be rotated relative to the mounting block to expose a new sharp cutting edge. After all three edges have been used, the cutting tool is simply replaced and the cycle begun again.

Figure 3:
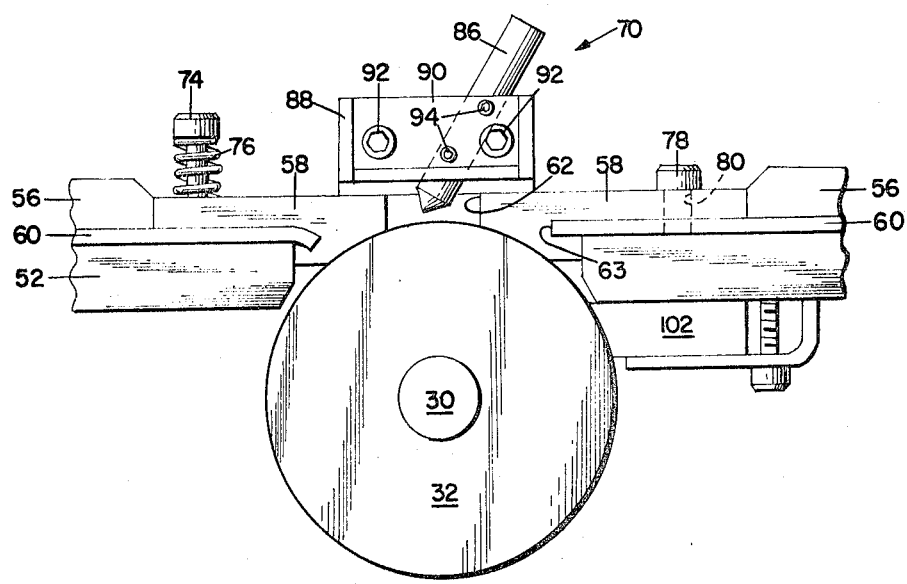
FIG. 3 is a front elevational view of the cutter sub-assembly of the sheet metal deburring apparatus of FIG. 1.
Figure 4:
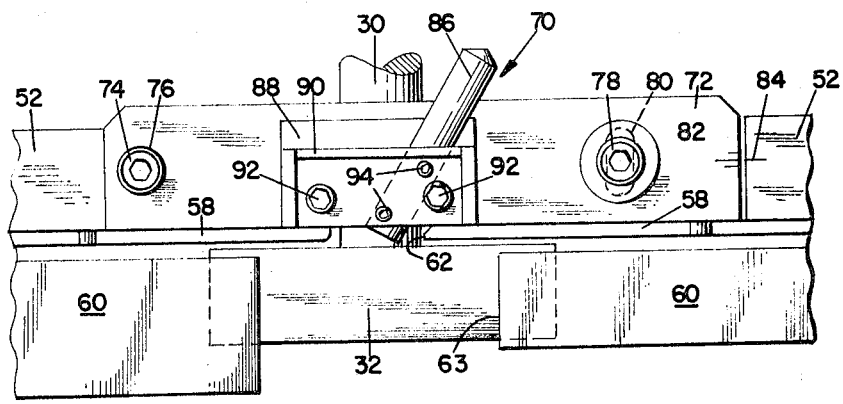
FIG. 4 is a plan view of the cutter sub-assembly of FIG. 3.

The cutting tool performs the initial deburring operation on the edge of the workpiece. However, a slight burr may remain on the edge and this burr is removed by a second deburring operation performed by a wire wheel 96 driven by a motor 98 mounted on base 10. A suitable opening 100 is provided in gate 56 to permit the periphery of the wheel to extend into the path of the workpiece. Felt pads 102, see FIG. 3, may be employed to clean the rollers, the pads bearing against the roller peripheries to wipe any cuttings therefrom.

In operation, the workpiece is moved along the gate until it is gripped by the rollers, moved past cutting tool 86 cutter for the first deburring operation, and moved to wire wheel 96 for the second deburring operation.

Gate 56 is fixed against movement and the cutter sub-assembly is horizontally pivotable relative to the gate to determine the depth of cut.

What I claim is:

1. Sheet metal deburring apparatus for removing burrs from the edges of a workpiece comprising:
   a. base;
   b. a pair of vertically aligned rollers mounted for rotation relative to said base;
   c. gear drive means for rotating the rollers;
   d. a gate immovably fixed to the base;
   e. a cutter sub-assembly pivotally supported on said gate for limited horizontal movement relative thereto, the cutter sub-assembly including a triangulate cutting tool having three cutting edges, one of the cutting edges being positioned between the axes of the rollers and in a vertical plane containing the axes of the rollers so as to be disposed in the path of the workpiece; and
   f. a finishing tool mounted for rotation relative to the gate;
   g. the pair of rollers feeding the workpiece along the gate to and past the triangulate cutting tool of the cutter sub-assembly for removing burrs from the workpiece and to and past the finishing tool for performing a final deburring operation thereon.

2. Sheet metal deburring apparatus according to claim 1, including means for continuously varying the spacing between the rollers.

3. In sheet metal deburring apparatus for removing burrs from the edge of a workpiece, comprising frame means including base means defining a path of travel for the workpiece, a pair of vertically aligned pinch rollers, means rotatably mounting said rollers on said frame means for moving a workpiece along said path, means for driving said pinch rollers, and a cutting tool for removing burrs from the workpiece as it is moved along said path, the improvement that cutting tool support means are disposed on said frame means and are so constructed that the cutting tool is positioned so that its cutting edge is disposed between the axes of the rollers substantially within a vertical plane containing the axes of the rollers and within said path with the cutting edge engaging the workpieces at a point substantially adjacent to the engagement of the workpieces by the rollers so that said workpiece is deburred at a point where said workpiece is firmly equipped by said rollers resulting in less chatter.

4. Apparatus according to claim 3, wherein said cutting tool is a triangulate cutting tool having three cutting edges.

5. Apparatus according to claim 3, wherein said cutting tool support means includes means permitting movement of said cutting tool relative to said path of travel, and said base means further comprises fixed members disposed between said cutting tool support means and said path of travel and defining a fixed opening therebetween, said fixed opening defining a fixed gate for said cutting tool.

* * * * *